United States Patent [19]

Banus Garcia

[11] Patent Number: 4,879,439
[45] Date of Patent: Nov. 7, 1989

[54] APPARATUS FOR CONTROLLING START UP AND STOP DOWN OF A HYDRAULIC PUMP

[76] Inventor: Fernando Banus Garcia, C. Sant Ramon, 6, 08230 Matadepera Barcelona, Spain

[21] Appl. No.: 284,075

[22] Filed: Dec. 14, 1988

[30] Foreign Application Priority Data

Dec. 18, 1987 [ES] Spain .................... 8800189

[51] Int. Cl.$^4$ ............................................. H01H 35/34
[52] U.S. Cl. .......................... 200/81.9 M; 200/83 L; 200/81.5; 340/611; 307/118
[58] Field of Search ................ 200/84 B, 84 C, 83 R, 200/83 Q, 83 Z, 83 S, 83 J, 83 L, 81.9 R, 81.9 M, 81.4, 81.5; 335/205–207; 340/606, 611, 626, 614, 620; 73/717, 722, 745, 308, 313, 271, 861.44, 861.47; 307/118

[56] References Cited

U.S. PATENT DOCUMENTS

| | | | |
|---|---|---|---|
| 4,067,239 | 1/1978 | Arvisenert | 73/271 |
| 4,266,517 | 5/1981 | Sakakibara | 200/83 L |
| 4,278,858 | 7/1981 | Kaessen | 200/84 C |
| 4,365,125 | 12/1982 | Keller | 200/81.9 M |
| 4,533,908 | 8/1985 | Fujikawa | 340/626 |
| 4,788,389 | 11/1988 | Okataki | 200/81.9 M |

*Primary Examiner*—Gerald P. Tolin
*Attorney, Agent, or Firm*—Steinberg & Raskin

[57] ABSTRACT

The apparatus is of the kind comprising a flow detector supplying, in the absence of flow, a stop down signal for the pump, a pressure detector supplying, for a predetermined minimum value of the pressure, a start up signal for the pump, and impeller means for the pressure detector, and is featured by the fact that the pressure detector comprises a movable part (1, 2) which is integral with a membrane (3) closing a cavity (3b) communicating with the hydraulic network, and a fixed part (4, 5) arranged in the apparatus body at the displacement position of the movable part (1, 2), the impeller means for the movable part of the pressure detector are constituted of a spring (8) mounted between the said movable part (1, 2) and the apparatus body (9), the flow detector comprising a part (6, 7) which is movable in the vertical direction and performs the function of gravity closing valve, and a fixed part (4, 5) which is arranged in the apparatus body.

7 Claims, 2 Drawing Sheets

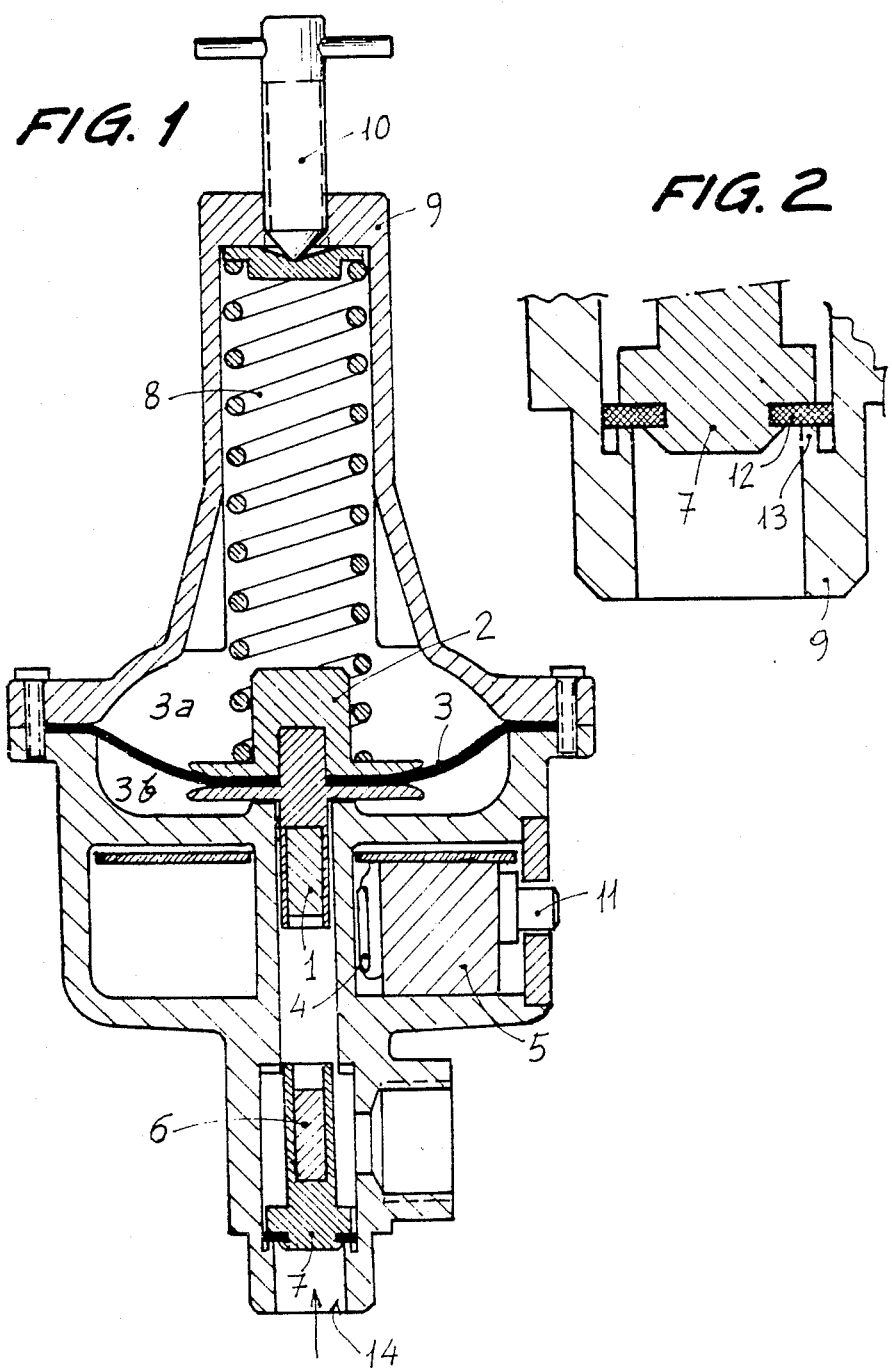

APPARATUS FOR CONTROLLING START UP AND STOP DOWN OF A HYDRAULIC PUMP

The present invention relates to an apparatus for controlling start up and stop down of a hydraulic pump.

BACKGROUND OF THE INVENTION

In some hydraulic networks wherein a liquid is supplied under the action of a pump, such as, for example, house water installations including a pressure water tank and water pump generally powered by an electric motor, the pump must be stopped down and started up according to the needs. In short, the matter is with the fact that the pump is to be started up when a valve or cock is opened, in order to hold a pressure in the tank and associated network, and stopped down when the cock is closed, in order to prevent a pressure rise over a desired value.

There are nowadays several apparatus for controlling the stop down and start up of such a pump.

The most used kind of apparatus consist of a pressure controlled switch connecting and disconnecting the pump within maximum and minimum pressure limits. In order to damp the hydraulic surge and also to act as a liquid accumulator thus lengthening the periods between the pump start up and stop down operations, the apparatus is provided with a so called "hydrosphere", a sphere shaped receptacle in the inside of which a movable membrane receives on one side the network liquid pressure and encloses at the other side a given volume of pressure air, the volume of which is variable according to the network pressure.

A safety detector must be installed together with the above apparatus, acting on the basis of a minimum level in the tank, in order to prevent the pump from burning down when it is sucking with no liquid in the network.

Besides, this kind of apparatus are subject to several drawbacks.

In first place, the hydrosphere is usually made of steel, which rusts thus causing impairment of the membrane and frequent replacement of this latter. In second place, the hydrosphere is very bulky, thus making difficult the installation thereof.

Owing to the constructive features of the apparatus, there is always a pressure variation between a minimum value and a maximum value, which is governed by a pressure controlled switch. This pressure variation may be rather high, for example of 2 to 3 Kg/cm$^2$, and has a negative influence on the use of some apparatus such as the gas operated water heaters in which the lighting is controlled by the water pressure.

There are known also other kinds of apparatus essentially comprising a flow detector providing, in the absence of flow, the stop down signal for the pump, and a pressure detector providing, for a predetermined value of the pressure, the start up signal for the pump, and impeller means for the pressure detector, consisting of the hidrosphere membrane upon which the inner air acts.

In this case, some of the problems are solved because of the pump being started up by the flow detector, so that the pressure surge effect is considerably reduced. However, a hydrosphere is still present, though it may be smaller owing to the surge pressure effect being reduced. Some of the drawbacks which are inherent with the use of the hydrosphere are thus remaining: the air pressure within the hydrosphere is not easily regulable, and there is always some pressure loss with time, which claims for a periodic air replenishment.

On the other hand, the flow detector is associated with a valve which is operated by the liquid flow and provided with a return spring, and this latter performs closure somewhat abruptly, thus enhancing the pressure surge effect.

DESCRIPTION OF THE INVENTION

The apparatus according to the invention achieves solving of the above noted drawbacks and provides other advantages to be described.

The apparatus for controlling start up and stop down of a hydraulic pump making the subject of the invention, is featured in that the pressure detector comprises a movable part which is integral with a membrane arranged within a cavity communicating with the hydraulic network, and a fixed part arranged in the apparatus body at the displacement position of the movable part, the impeller means for the movable part of the pressure detector are constituted of a spring mounted between the said movable part and the apparatus body, the flow detector comprising a part which is movable in the vertical direction and performs the function of gravity closing valve, and a fixed part which is arranged in the body.

The apparatus of the invention thoroughly dispenses with the hydrosphere, thus removing all of the problems related with the use of same. Further to reducing the membrane maintenance problems, a stable pressure is achieved because such pressure no longer depends on the air pressure.

Because the flow detector acts under gravity, the previously used spring is dispensed with a corresponding simplification of the mechanism. The valve as well acts in an essentially slow manner, such that no pressure surge phenomenon arises in the case of an abrupt flow interruption in the network.

Preferably, the movable part of the pressure detector is a permanent magnet, and the fixed part of the same is a magnetic detector connected to an amplifier network. This detector provides a great accuracy and fast response. It is also noticeable the service reliability of the magnetic detector as regards other detectors usually employed, such as photoelectric cells.

To advantage, the impeller spring tension is adjustable, thus providing for a regulation of the minimum pressure for starting up the pump. This kind of regulation is by far more comfortable and faster that the regulation used in the known apparatus provided with hydrosphere, in which a pneumatic pump needs to be resorted to.

An important feature to be underlined resides in that the movable part of the pressure detector is located, in its lower position, under the zone corresponding to the detection of a minimum pressure in the detector. In this position the detector is not activated and acts as a minimum liquid level detector.

It is thus not a simple minimum pressure detector, but it acts as a level detector, thus avoiding operation of the pump when the network carries no liquid, and the corresponding impairment.

It is also preferable that the movable part of the flow detector is a permanent magnet, and the fixed part of the flow detector a magnetic detector connected to an amplifier network. As indicated above in connection with the pressure detector, this flow detector achieves as well a great accuracy and fast response. On the other side, it is to remark the service reliability of the magnetic detector as regards other kinds of used detectors, such as photoelectric cells.

In a preferred embodiment of the invention, the fixed part of the pressure detector and the fixed part of the flow detector are constituted of a single magnetic detector connected to an amplifier network. Accordingly, a single magnetic detector receives the signals of two movable parts, thus simplifying the apparatus ensemble, especially the electronic circuitry associated with the detector.

Finally, it is important to note that the amplifier network is provided with a push button to manually emulate the magnetic detector signal. This feature is specially useful for manually starting up the pump when there is no water in the tank. The pump is manually set on after the tank has been filled.

BRIEF DESCRIPTION OF THE DRAWINGS

For a better understanding of the above, a drawing is enclosed showing a diagrammatic and non-restrictive example of a practical embodiment. In the said drawings:

FIG. 1 is a view in longitudinal section of the apparatus of the invention, showing the position corresponding to no liquid flow and no liquid in the tank;

FIG. 2 shows a detail of the valve, and

DESCRIPTION OF A PREFERRED EMBODIMENT

Figure 3:
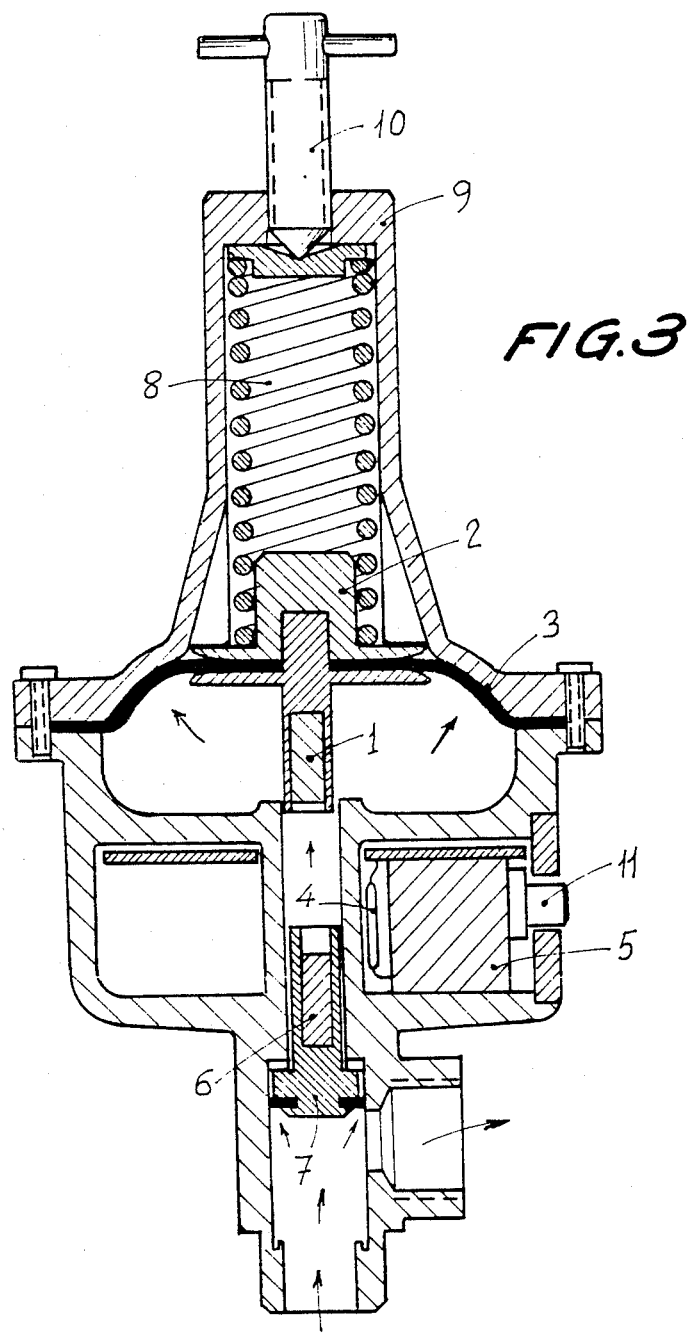
FIG. 3 shows the apparatus of FIG. 1 in the position corresponding to a liquid flow.

As indicated in FIG. 1, the apparatus of the invention comprises a pressure detector having a movable part formed of a magnet 1 mounted in a body 2 which is joined to a membrane 3, in turn mounted in a cavity of the body 9 such that it defines an atmospheric chamber 3a in communication with the outside, and a pressure chamber 3b connected through means not shown with the pressure water network. The fixed part of the said detector is formed of a magnetic detector 4 connected to an amplifier network 5 in turn connected with the control switch of the pump motor through conventional measures not requiring to be further described. The apparatus comprises also a flow detector, the movable part of which is slidable in a vertical direction, includes a magnet 6, and is arranged to perform the function of a closing valve 7, while its fixed part is constituted of the same magnetic detector 4 and amplifier network 5. A spring 8 mounted between the body 2 and the apparatus body 9, loads the membrane 3 of the pressure detector.

The load of the spring 8 can be adjusted by means of the screw 10.

As can be seen in FIG. 1, the amplifier network is provided with a push button 11 to manually emulate the signal of the magnetic detector 4.

FIG. 2 shows a detail of the valve 7 with the closing gasket 12 fitting onto the shoulder 13 of the body 9. It is an example of embodiment as, obviously, any such other kind of suitable closure may be used.

The working of the apparatus of the invention is as follows:

When there is no wataer in the network, the apparatus is in the position shown in FIG. 1.

When, with the ensemble of the network filled with water in working condition, a cock (not shown) is opened to supply an amount of water for use, water begins to circulate along the hydraulic network and enters the apparatus of the invention through the inlet 14 and drags together the movable part 7 of the flow detector until this part comes to the position of FIG. 3, wherein the magnetic detector 4 sends a signal, through the amplifier network 5, to the motor driving the pump, in order to start up this latter.

When the pump is operated, the hydraulic pressure pushes upwards the membrane 3 overcoming the action of the spring 8 and dragging with it the body 2 of which the magnet 1 is integral. The pump remains operated while the magnet 6 is facing the detector 4 and the magnet 1 is spaced apart of the same, as indicated in FIG. 3.

When the cock is closed, water stops flowing and the movable part 7 of the flow detector falls under gravity to the position of FIG. 1. In this position, magnet 6 has moved apart from the detector 4, thus causing a stop down signal to be sent to the pump. As long as a pressure exists in the network, the membrane remains in the position of FIG. 3.

In the case where no water is present in the network, the membrane 3 comes to the position indicated in FIG. 1, and thus the magnet 1 is located under the zone corresponding to the detection of a minimum pressure by the detector 4, wherein the said detector 4 is not activated and operates as a liquid minimum level detector. In order that the pump may be started up, the push button 11 must be depressed.

As explained above, the tension of spring 8 is adjustable, thus regulating the minimum pressure for starting up the pump.

The above description corresponds to a specific embodiment of the invention, tough all of the possible variations which are accessible to an expert of the art are embraced within the scope of the invention.

I claim:

1. Apparatus for controlling start up and stop down of a hydraulic pump, of the kind comprising a flow detector supplying, for a predetermined minimum value of flow, a start up signal for the pump, a pressure detector supplying, for a predetermined minimum value of the pressure, a start up signal for the pump, and impeller means for the pressure detector, characterized by the fact that the pressure detector comprises a movable part (1.2) which is integral with a membrane (3) closing a cavity (3b) communicating with the hydraulic network, and a fixed part (4,5) arranged in the apparatus body at the displacement position of the movable part (1,2), the impeller means for the movable part of the pressure detector are constituted of a spring (8) mounted between the said movable part (1,2) and the apparatus body (9), the flow detector comprising a part (6,7) which is movable in the vertical direction and performs the function of gravity closing valve, and a fixed part (4,5) which is arranged in the apparatus body.

2. Apparatus according to claim 1, characterized by the fact that the movable part of the pressure detector is a permanent magnet (1), and the fixed part is a magnetic detector (4) connected to an amplifier network (5).

3. Apparatus according to claim 1, characterized by the fact that the load of the impeller spring (8) is adjustable, thus providing for a regulation of the minimum pressure for starting up the pump.

4. Apparatus according to claim 2, characterized by the fact that the movable part (1,2) of the pressure detector is located, in its lower position, under the zone corresponding to the detection of a minimum pressure by the detector, in which position the detector is not activated and acts as a minimum liquid level detector.

5. Apparatus according to claim 1, characterized by the fact that the movable part (6,7) of the flow detector is a permanent magnet (6), and the fixed part of the flow detector is a magnetic detector (4) connected to an amplifier network (5).

6. Apparatus according to claim 1 characterized by the fact that the fixed part of the pressure detector and the fixed part of the flow detector are constituted of a single magnetic detector (4) connected to an amplifier network (5).

7. Apparatus according to claim 6, characterized by the fact that the amplifier network (5) is provided with a push button (11) to manually emulate the magnetic detector signal.

* * * * *